United States Patent
Eyer

(10) Patent No.: US 8,886,009 B2
(45) Date of Patent: Nov. 11, 2014

(54) CREATION OF VIDEO BOOKMARKS VIA SCRIPTED INTERACTIVITY IN ADVANCED DIGITAL TELEVISION

(75) Inventor: Mark Eyer, Woodinville, WA (US)

(73) Assignee: Sony Corporation, Tokyo (JP)

(*) Notice: Subject to any disclaimer, the term of this patent is extended or adjusted under 35 U.S.C. 154(b) by 147 days.

(21) Appl. No.: 13/304,126

(22) Filed: Nov. 23, 2011

(65) Prior Publication Data

US 2012/0275764 A1 Nov. 1, 2012

Related U.S. Application Data

(60) Provisional application No. 61/479,116, filed on Apr. 26, 2011.

(51) Int. Cl.
| | |
|---|---|
| *H04N 9/80* | (2006.01) |
| *H04N 21/81* | (2011.01) |
| *G11B 27/11* | (2006.01) |
| *H04N 21/8545* | (2011.01) |
| *H04N 21/858* | (2011.01) |
| *G06F 17/30* | (2006.01) |
| *H04N 9/82* | (2006.01) |

(52) U.S. Cl.
CPC ......... *H04N 21/8133* (2013.01); *G11B 27/11* (2013.01); *H04N 21/8166* (2013.01); *H04N 21/8545* (2013.01); *H04N 21/8586* (2013.01); *G06F 17/30817* (2013.01); *G06F 17/3082* (2013.01); *H04N 9/8205* (2013.01)
USPC ........................................... 386/241; 386/248

(58) Field of Classification Search
USPC ......................................... 386/239–241, 248
See application file for complete search history.

(56) References Cited

U.S. PATENT DOCUMENTS

| | | |
|---|---|---|
| 2006/0282776 A1 | 12/2006 | Farmer et al. |
| 2007/0154190 A1* | 7/2007 | Gilley et al. ................. 386/125 |
| 2009/0204481 A1 | 8/2009 | Navar et al. |
| 2009/0254931 A1 | 10/2009 | Pizzurro et al. |
| 2010/0169786 A1 | 7/2010 | O'Brien et al. |
| 2011/0075841 A1 | 3/2011 | Chen et al. |
| 2011/0075990 A1* | 3/2011 | Eyer ............................ 386/241 |
| 2011/0219386 A1* | 9/2011 | Hwang et al. ................ 719/328 |
| 2011/0258049 A1 | 10/2011 | Ramer et al. |

FOREIGN PATENT DOCUMENTS

WO    WO 2007-082167    7/2007

OTHER PUBLICATIONS

International Search Report and Written Opinion issued Aug. 3, 2012, in PCT/US 12/32847 filed Apr. 10, 2012.
Engin Erdogan, "An On-Demand Advertising Model for Interactive Television", [retrieved on line URL:http://lcc.gatech.edu/projects/ms_projects/eerdogan/enginerdogan__masters_designdoc.pdf, retrieved on Jul. 14, 2012] Apr. 2004, 35 pages.

(Continued)

*Primary Examiner* — Thai Tran
*Assistant Examiner* — Nigar Chowdhury
(74) *Attorney, Agent, or Firm* — Oblon, Spivak, McClelland, Maier & Neustadt, L.L.P.

(57) ABSTRACT

According to one embodiment of the invention, a method for creating and/or altering a video bookmark is described. The method comprises an operation of processing a request from a downloaded scripted object to create a video bookmark. The video bookmark may be information that is used for performing an action involving additional information related to the video content being played at a time of the request. Thereafter, the video bookmark is created based on the request.

18 Claims, 9 Drawing Sheets

(56) References Cited

OTHER PUBLICATIONS

Philip Leroux, et al., "Efficient Deployment of Personalised over iDTV advertising over DSL Networks", [retrieved on line URL:http://en.scientificcommons.org/37857383, retrieved on Jul. 14, 2012], 2008, pp. 68-72 plus 7 additional pages.

Extended European Search Report issued Aug. 25, 2014 in PCT/US2012/032847.

* cited by examiner

CREATION OF VIDEO BOOKMARKS VIA SCRIPTED INTERACTIVITY IN ADVANCED DIGITAL TELEVISION

CROSS-REFERENCE TO RELATED APPLICATIONS

This application is based upon and claims the benefit of priority from U.S. Provisional Patent Application No. 61/479,116 filed Apr. 26, 2011, the entire contents of which are incorporated herein by reference.

FIELD

Embodiments of the present invention relate to the field of communications, and in particular a triggered declarative object (TDO) that enables user interaction with multimedia content to create a video bookmark.

BACKGROUND

For many decades, traditional media distribution systems lacked an ability to effectively characterize and respond to consumer preferences in order to provide customized media content. In other words, traditional television broadcasting did not personalize the viewing experience because it did not address the undeniable fact that different viewers have different interests. With the advent of Internet-enabled television platforms, however, a wide variety of services and features directed to the individual viewer are now possible.

One current implementation of Internet-enabled television captures events such as record, play, re-play and pause. This operation is typically operated in the background. By correlating the precise timing of the event with the channel line-up and channel number, a determination can be made as to what exactly was being viewed when the event occurred.

Likewise, some players (e.g., Pandora® Internet radio players) are implemented with a function that allows the "bookmarking" of songs. If a song is played that is enjoyable for the listener, he or she can push a button on the player, which causes the title and/or artist of that song to be reported to a website. Later, when the user visits the website, he or she may review the list of video bookmarked songs and possibly decide to purchase one or more of the bookmarked songs from an online store.

Advanced television systems are being designed and service launched which include interactive elements. Along with audio and video, a television service provider can provide content which is programmed by that provider to offer the user an interactive experience with the content. This interactive content typically consists of a combination of scripted and declarative (e.g. textual and graphical) content.

Currently, there is no mechanism that allows scripted interactivity with the user to create video bookmarks for later retrieval of information on subject matter perceived by the user during playing of multimedia content.

BRIEF DESCRIPTION OF THE DRAWINGS

Embodiments of the present invention are illustrated by way of example, and not by way of limitation, in the figures of the accompanying drawings and in which.

DETAILED DESCRIPTION

Figure 1:
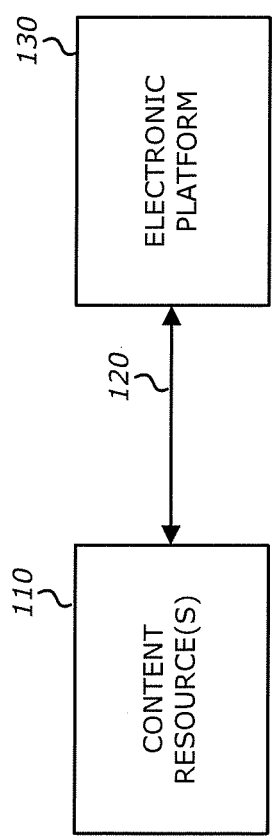
FIG. 1 is an exemplary block diagram illustrating one embodiment of a digital content playing system.

One embodiment of the invention relates to an electronic device that supports a triggered declarative object (TDO), where the TDO is adapted to enhance user interaction with multimedia content through the creation of a video bookmark.

Herein, a "video bookmark" is a recordation of information and/or metadata pertinent to the content being viewed around the time when a user-initiated bookmark event occurs. The type of information and metadata stored as a video bookmark may include the time of the bookmark event, the channel name, the channel number, the identity of the program or advertisement being displayed, caption text, a Uniform Resource Locator (URL), an object, a pointer, or another information type.

A "TDO" is a downloadable object, normally created by a service or content provider in the content distribution chain. According to one embodiment of the invention, a TDO comprises declarative data (e.g., scripts, text, graphics, etc.) whose function and behavior are tied in some way to the playing of multimedia content. Herein, a TDO may be adapted with multiple functions in which one of these functions is interactive so as to (for example) provide the user with options to obtain more details about the corresponding multimedia content.

In general, one embodiment of the invention combines the TDO concept with bookmarking to allow a creator of a TDO to offer the user a way to create a video bookmark. For instance, a user may arrive at a point in a program or advertisement being displayed by an electronic platform, such as a digital television for example, where he or she would like to preserve some pertinent information about the subject matter so that a deeper exploration of the subject matter can be made at a later time. Allowing the user to create and save a "video bookmark" affords this functionality.

According to one embodiment of the invention, at the time a bookmark event occurs, a receiver within the digital television would need to store information sufficient to allow in-depth exploration of the subject matter of the content being displayed to occur later, when the user desires to explore the video bookmarked items. Such stored information could be as minimal as an Internet Uniform Resource Locator (URL) that points to a website where more information concerning the subject matter may be found. Another type of stored information may include one or more pointers to a set of files that are directed to the subject matter and provided by non-real time (NRT) broadcast delivery. These files may be audio/video, or text/graphics/markup (formatted as web pages).

In accordance with an embodiment of the invention, the TDO is downloaded and played in conjunction with real-time or NRT audio/video programming. An Application Programming Interface (API), which is available to the TDO author and supported in an electronic platform that plays the TDO, offers the ability to create a video bookmark under control of the TDO's scripting language. The TDO can pass, across the API, metadata such as a URL, time/date, channel number, graphics, text, or the like to enhance the user experience when the video bookmark is accessed later.

One purpose of this embodiment of the invention is to increase a user's enjoyment and benefit of the interactive television experience. Broadcasters are happy to support their advertisers, and users can enjoy the benefits of access to products and services offered by advertisers without disruption of their viewing experience.

One embodiment of the invention involves defining an API for use by TDOs which would allow the author of the TDO to offer the user a way to interact with programming such that a video bookmark is created. This API, referred to as the "Bookmark API," would include information (or pointers to information) associated with the bookmark event. In a simple example, the information may consist of a simple URL. In a more complex example, the information could include pointers to a number of files deliverable either by NRT means or via the Internet. The files could contain multimedia content such as audio/video content, text/graphics/declarative markup, or other data.

Receiver support of the API involves saving the data and/or pointers associated with the bookmark event in memory in a "bookmark queue." The receiver offers a user interface function to review the saved video bookmarks. When the user accesses the "Browse Video Bookmarks" function, the receiver constructs a list of available video bookmarks and allows the user to choose one he or she would like to explore. In response to the selection of a video bookmark, the receiver uses the information as appropriate. Two examples: if the video bookmark data is a URL, the receiver receives pages or objects from the indicated location on the Internet and displays them. If the video bookmark data is an audio/video file, the receiver plays the file.

Preferred practice is to extend the same scripting language the Advanced Television Systems Committee (ATSC) 2.0 TDO is based on to add the necessary API functionality. API function calls to be defined for the video bookmarks may include, but are not limited or restricted to the following: (1) CREATE_BOOKMARK—data passed with this function can include a video bookmark identifier (ID) and one or more URLs or pointers to objects; (2) DELETE_BOOKMARK—this function can be used by the TDO to delete a video bookmark, if one had been previously created; (3) IS_BOOKMARK_PRESENT—this function allows the script to query the receiver to see whether or not a given video bookmark had already been stored; and (4) UPDATE_BOOKMARK—this function can be used by the TDO to update the contents of the bookmark. Another API function may include APPEND_BOOKMARK, which is used to combine functionality for different video bookmarks.

Herein, certain terminology is used to describe features for embodiments of the invention. For example, an "electronic platform" generally includes logic that operates to process information. Different embodiments of an electronic platform may include, but are not limited or restricted to a set-top box, a computer (e.g., tablet, laptop, desktop, server, netbook, etc.), a wireless communication device (e.g., a smartphone, personal digital assistant "PDA", pager, etc.), a set-top box, or a display device (e.g., television) that comprises a receiver for example.

It is contemplated that the electronic platform may include a number of components, including one or more of the following: (i) a display (e.g., liquid crystal diode ("LCD"), organic LCD (OLCD), plasma, etc.) or a video output supplying a video signal to a separate display device; (ii) speakers to support audio playback or an audio output supplying an audio signal to a separate audio amplifier or speakers; or (iii) a non-transitory computer-readable storage media (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive).

Additionally, the term "logic" is generally defined as hardware and/or software. As hardware, logic may include processing circuitry (e.g., a controller, a microprocessor, a programmable gate array, an application specific integrated circuit, etc.), semiconductor memory, combinatorial logic, or the like. As software, the logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

Additionally, the term "interconnect" is broadly defined as a logical or physical communication path such as, for instance, electrical wire, optical fiber, cable, bus trace, or a wireless channel using infrared, radio frequency (RF), or any other wireless signaling mechanism. Also, the term "message" constitutes any grouping of data in the form of a packet, an Asynchronous Transfer Mode (ATM) cell, a frame, or a series of bits.

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description. Moreover, the illustrated embodiments of the invention, and the description associated therewith, should be considered as examples of the principles of the invention and not intended to limit the invention to those specific embodiments. In the description below, like reference numerals are used to describe the same, similar or corresponding parts in the several views of the drawings.

Lastly, the term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

FIG. 1 is an exemplary block diagram illustrating one embodiment of a digital content playing system 100. Digital content playing system 100 comprises one or more content resources 110 that are adapted to transmit multimedia content to an electronic platform 130 over an interconnect 120. This multimedia content may be in a variety of forms, including non-real-time (NRT) content, real-time (or linear) content, metadata associated with content, and a triggered declarative object (TDO).

According to one embodiment of the invention, one type of content resource 110 may feature a device that is adapted to store and provide NRT content upon request. In general, "NRT content" comprises data (e.g., video, audio, text, images, etc.) that is delivered faster or slower than delivery in real-time. In many cases, the NRT content is prompted for delivery in response to a request by the user or user access of a listing of NRT content stored at one of the content resources 110. Alternatively, such delivery may be automated.

Figure 2:
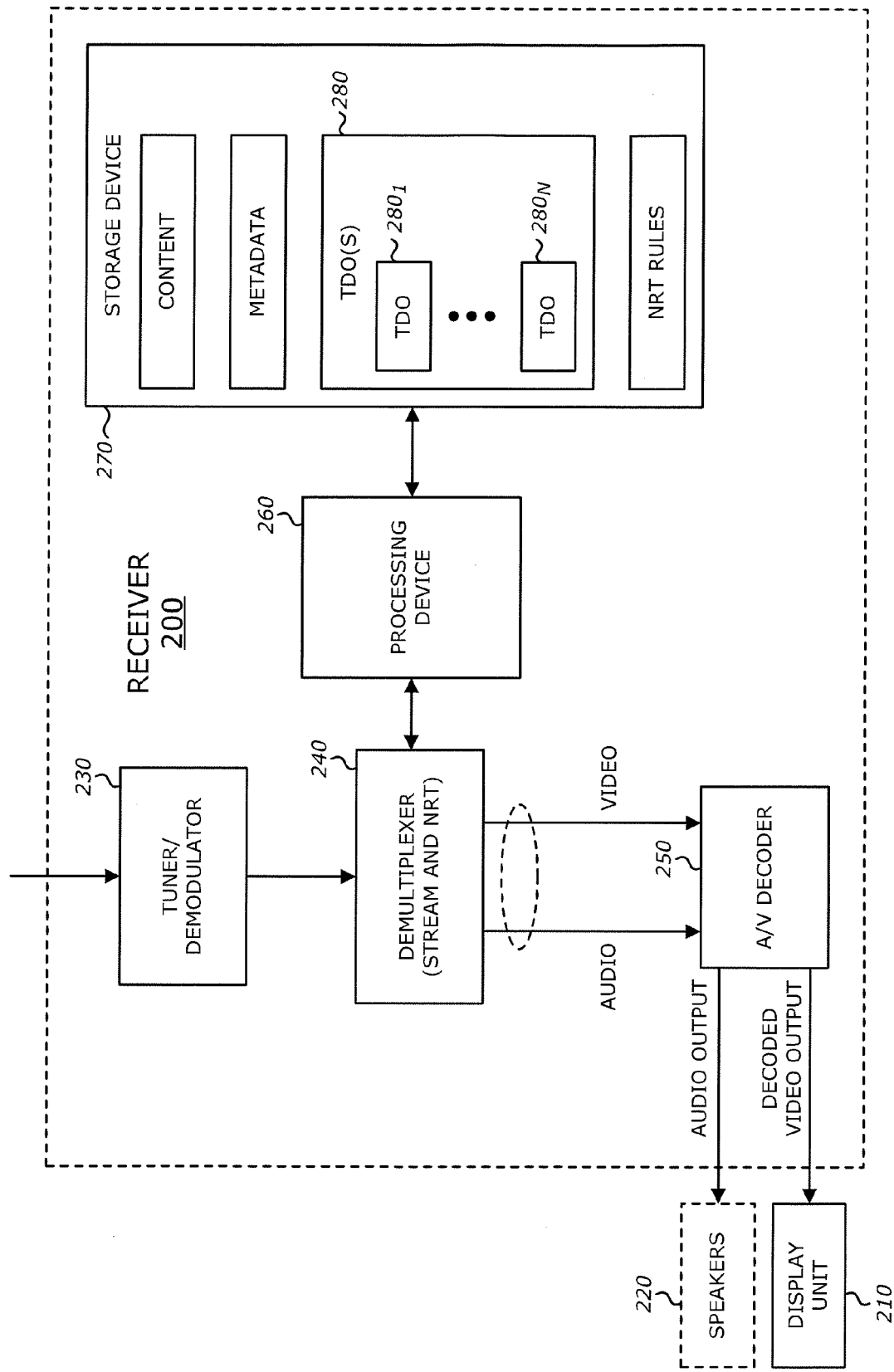
FIG. 2 is an exemplary embodiment of an electronic platform that is adapted to execute TDOs that provide video bookmark capability.

With respect to FIG. 2, an exemplary embodiment of electronic device 130 that is adapted to execute TDOs that provide video bookmark capability is shown. Herein, according to this embodiment of the invention, electronic device 130 comprises a receiver 200, which is coupled to a display unit 210 and optional speakers 220.

Herein, receiver 200 includes a tuner/demodulator 230, a demultiplexer 240, an audio/video decoder 250, processing logic 260, and a storage device 270. Herein, tuner 230 receives a modulated input signal, tunes and demodulates the signal to produce an output transport stream. Demultiplexer 240 demultiplexes the output transport stream to produce data that is received by processing logic 260. In the case of real-time (linear) content, audio and video messages from tuner/demodulator 230 are supplied, via demultiplexer 240, to A/V decoder 250 for decoding. A/V decoder 250 supplies an audio output signal and a video output signal to audio and video circuitry (not shown) associated with electronic platform 130.

Content including audio/video, NRT files, metadata, and TDOs received at demultiplexer 240 is routed via processing logic 260 to storage device 270. Storage device 270 may include any type of non-transitory computer-readable storage media with non-volatile characteristics such as a disc drive or semiconductor memory.

When a user instructs electronic platform 130 to play a selected item of NRT content, according to one embodiment of the invention, that content may be retrieved from storage device 270 and processed by processing logic 260. Of course, although not shown, processing logic 260 may obtain addressing information to retrieve the content from a remotely located storage device.

Thereafter, after processing the content (e.g. decompression, decryption, descrambling or reformatting), processing logic 260 provides the processed content to demultiplexer 240, which produces audio and video data to A/V decoder 250. Audio and video from these messages are eventually sent to speakers 220 and display unit 210, respectively.

Besides the data processing described above, processing logic 260 is adapted to execute one or more TDOs $280_{1-N}$ (N≥1) that are stored in storage device 270. At least one of these TDO(s) 280 (e.g., TDO $280_1$), when executed by processing logic 260, is adapted to control bookmarking operations for electronic platform 130 as multimedia content is being displayed on display unit 210.

It is contemplated that, in lieu of being implemented with decoder 250 and certain circuitry, receiver 200 may include processing logic 260 with automatic content recognition (ACR) functionality that generates a "fingerprint"—a sample of uncompressed video and/or audio. This sample is used for retrieval, from a local or external storage source, of a larger segment of video and/or audio for subsequent display and/or audio rendering.

In an exemplary implementation, a viewer performs a specific action that initiates a "bookmark event" (e.g., depressing a button on electronic platform 130 or on a remote control unit that activates a bookmarking function in electronic platform 130, saying "video bookmark" if electronic platform 130 has voice recognition functionality, etc.). In response to the specific action, viewing of the multimedia content is not interrupted. Rather, electronic platform 130 stores all relevant information and metadata that is pertinent to the multimedia content being viewed and is temporally proximate to the time at which the bookmark event occurred.

For instance, electronic platform 130 may store the last several seconds of multimedia content on disk in a file associated with the video bookmark. This multimedia content may include video and its corresponding audio. However, in lieu of or in addition to storage of audio/video, other types of content may be saved, such as any or all of the following: captured still images, caption text, "screen scraped" information in which optical character recognition techniques are used to extract text from the video sampled at the time of the bookmark event, or downloadable objects.

As an illustrative example, the relevant information and metadata pertinent to the multimedia content may include (1) the time that the bookmark event occurred and (2) the channel name and/or channel number over which the multimedia content is being received. Likewise, for retrieval of such multimedia content being played back from disk, the relevant information may include (1) a content identifier and (2) the time that the bookmark event occurred.

Figure 3:
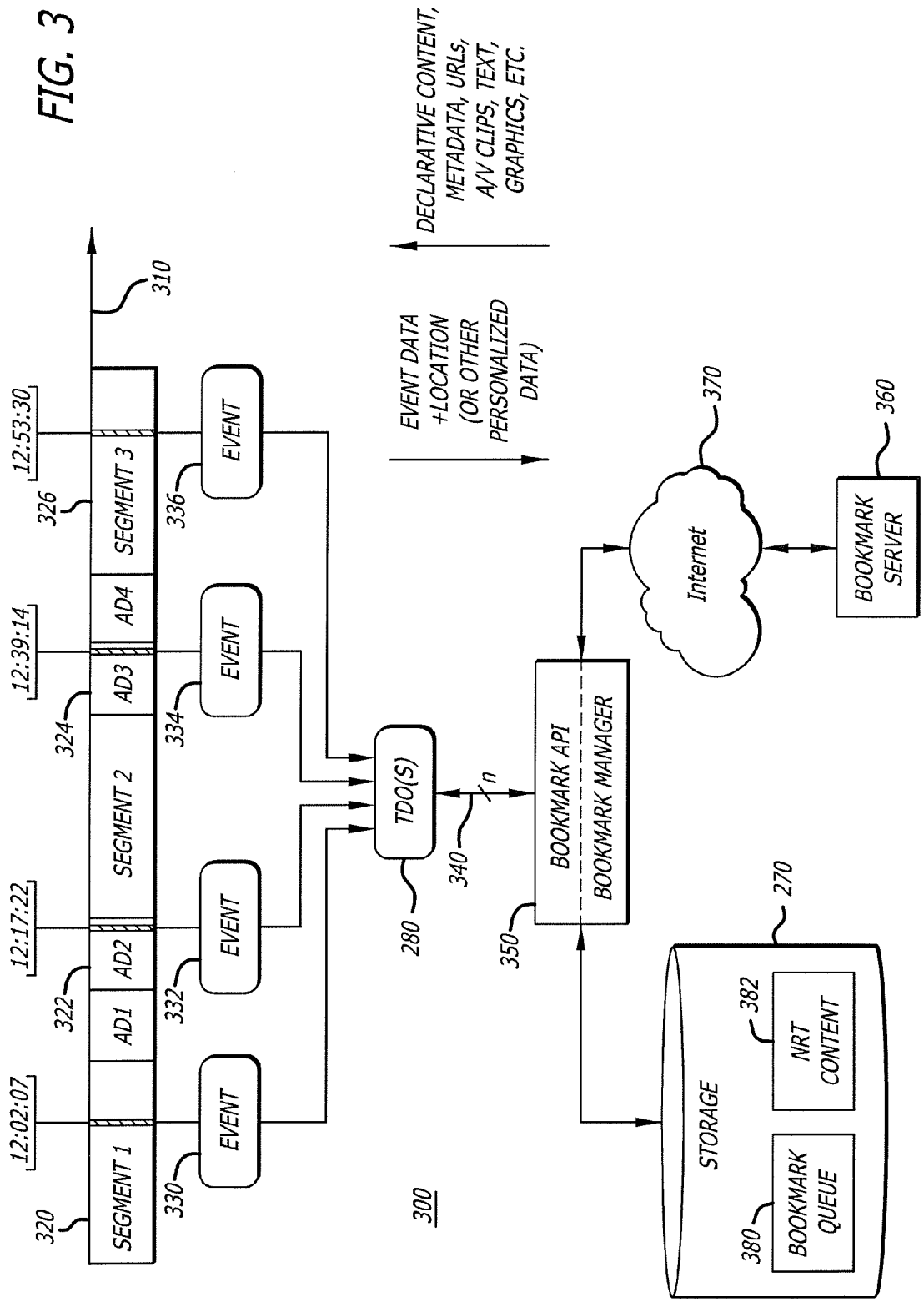
FIG. 3 is an exemplary implementation of a video bookmark system provided to illustrate how bookmark events are processed.

Referring now to FIG. 3, an exemplary implementation of a video bookmark system 300 illustrates how bookmark events are processed. According to a timeline 310, a video segment of a program, labeled "Segment 1" 320, is being displayed at the electronic platform. During the viewing of the program, at an example time marker of 12:02:07, a user performs a bookmark event 330 (e.g., depressing a specific button such as a "TAG" button, on a remote control), which prompts TDO 280 to create a video bookmark.

In creating a video bookmark, TDO 280 initiates a specific function call 340 to an API of Bookmark Manager 350 which, according to this embodiment of the invention, includes pertinent information and metadata that can be used for later retrieval of more detailed information directed to the subject matter being viewed. For instance, this API function call 340 may include at least one URL or pointer to data associated with objects being displayed during the bookmark event. As an optional parameter, API function call 340 may include a unique identifier for the video bookmark. The video bookmark identifier may be used by Bookmark Manager 350 to determine if (i) incoming content associated with a requested video bookmark is duplicative of any stored information or (ii) if a desired video bookmark had already been stored (e.g., using the IS_BOOKMARK_PRESENT API function call to allow the scripted TDO to determine whether or not a given video bookmark had already been stored). The video bookmark identifier and/or URL(s) (or pointers) are stored in a bookmark queue 380 within storage device 270.

Of course, TDO 280 may be scripted to store a variety of other information in response to creation of a video bookmark, including a screen shot of the display at time of the bookmark event, a video and/or audio clip (or a pointer to the clip) directed to subject matter being displayed in the multimedia content at the time of the bookmark event. Other bookmark events 332, 334 and 336 occur at time marker 12:17:22 during advertisement AD2 322, during time marker 12:39:14 during advertisement AD3 324, and again at time marker 12:53:30 during video segment (Segment 3) 326.

In the exemplary implementation, Bookmark API 350 may interact with a bookmark server 360 via a public network 370 (e.g., Internet) accessible by the electronic platform, by providing information about the bookmark event to server 360. This information enables server 360 to identify the program or advertisement within which the bookmark event occurred and to respond with information that is used by logic within the electronic platform to create an interactive experience involving subject matter displayed at the time of the bookmark event.

For instance, depending on the type of bookmark event, Bookmark API 350 may control the storage of pertinent information for creation of a video bookmark, the deletion of information associated with an existing video bookmark, or the updating of information associated with an existing video bookmark. If the bookmark event is recorded during a television program, this information might include, but is not limited or restricted to the following:

the program title, source channel number and name, program metadata (synopsis, etc.), and time relative to the start of the program the bookmark event occurred;

high-resolution video stills captured from the video that was displayed just prior to the bookmark event;

a short clip of the audio/video material during or that just preceded the bookmark event;

closed caption text captured from the programming, during or just prior to the bookmark event; or metadata available from the compressed or uncompressed audio/video distribution feed.

If the bookmark is recorded during an advertising segment, the information might include, in addition to the above, metadata representing the product or service being advertised. Such metadata might include, but is not limited to, a URL the user could use to access more information about the product or service, a telephone number or contact information, a map of the location of the advertised item, etc.

Figure 4A:
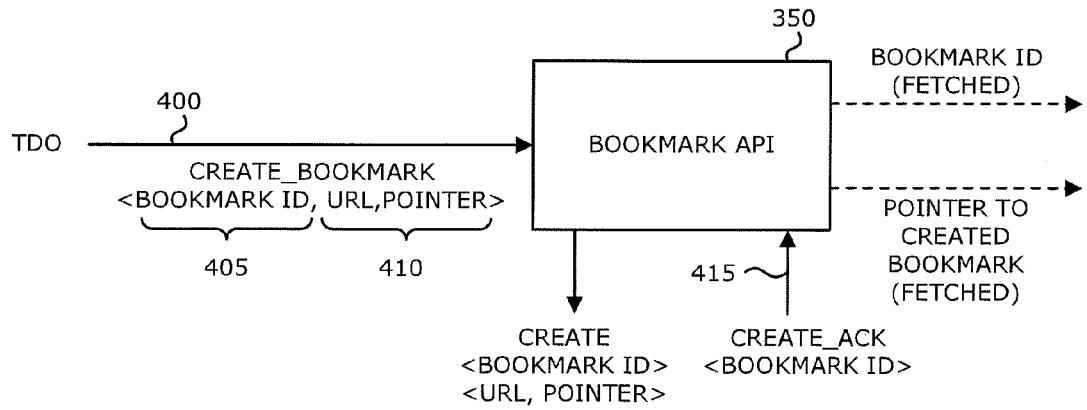
FIGS. 4A-4D are diagrams of illustrative examples of Bookmark API calls from the TDO to the Bookmark API for storage/retrieval of content.

Referring now to FIGS. 4A-4D, exemplary embodiments of different types of API function calls between TDO 280 and Bookmark API 350 are shown. Herein, as shown in FIG. 4A, in response to detection of a bookmark event, TDO 280 transmits a CREATE_BOOKMARK API function call 400 that includes information used to obtain supplemental information about the subject matter of the multimedia content being viewed. Herein, CREATE_BOOKMARK API function call 400 includes a video bookmark identifier (bookmark ID) 405 for subsequent use in identifying the video bookmark apart from other video bookmarks and addressing information 410 (e.g., a URL or pointer(s)) for retrieval of the supplemental information if the video bookmark is accessed later.

When content from the bookmark event is requested (e.g., user access of a Bookmark MENU, etc.), addressing information 410 may be retrieved to access content from one or more remotely located storage devices.

Figure 4B:
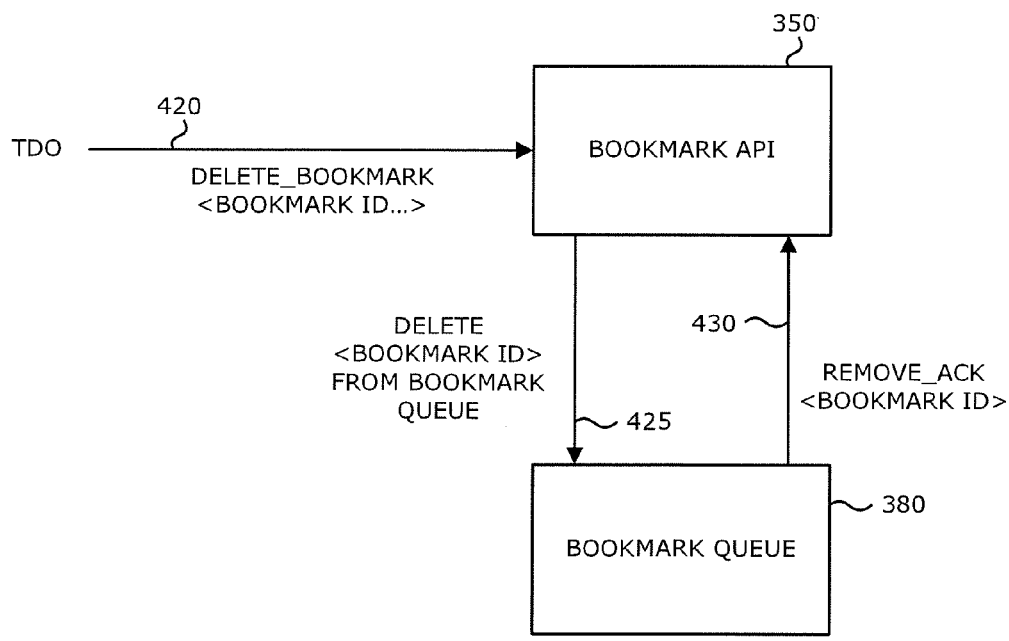

Referring now to FIG. 4B, in response to detecting a bookmark event by the user that requests deletion of a particular video bookmark, TDO 280 transmits a DELETE_BOOKMARK API function call 420 that includes at least the video bookmark identifier 425 used to identify the existing video bookmark stored within bookmark queue 380. After deletion of the identified video bookmark, signaling 430 is provided to the Bookmark API 350 to acknowledge completion of this event. If the video bookmark could not be located, an error code is returned.

Figure 4C:
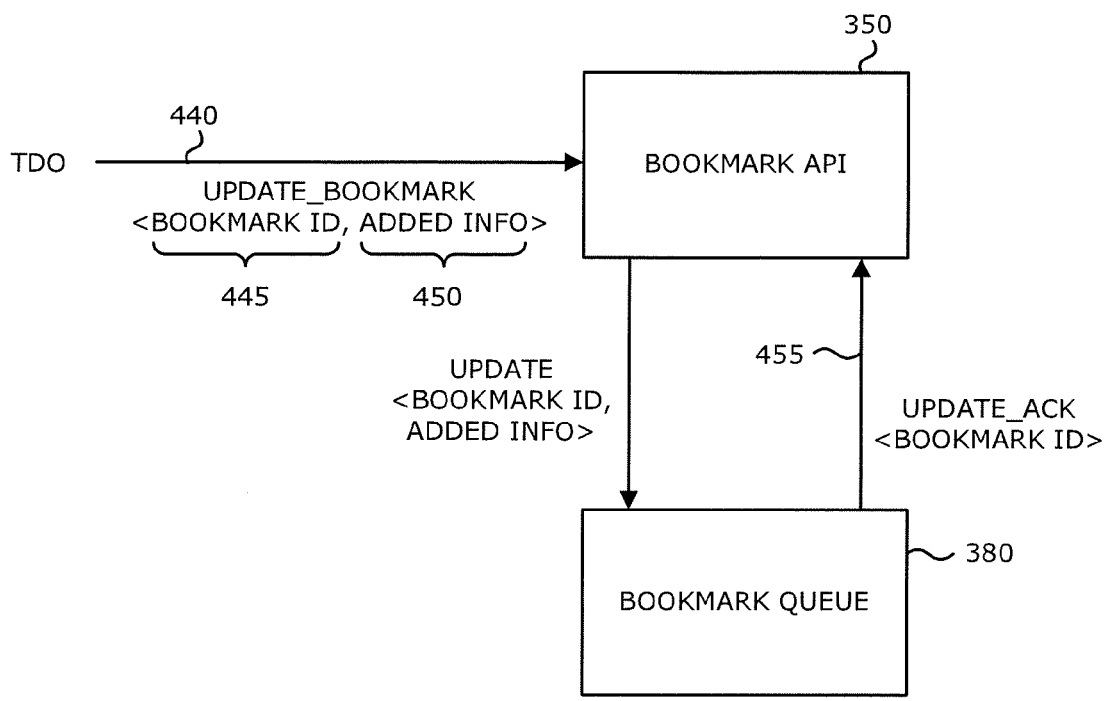

Referring to FIG. 4C, in response to detection of a bookmark event for updating an existing video bookmark, TDO 280 transmits an UPDATE_BOOKMARK API function call 440 that includes a plurality of parameters that can be used to locate information associated with the existing video bookmark and alter such information. Herein, UPDATE_BOOKMARK API function call 440 includes a video bookmark identifier 445 used to identify the existing video bookmark along with information 450 that is to be substituted for or added to the current stored information for the video bookmark. After modification of the video bookmark, signaling 455 is provided to the Bookmark API 350 to acknowledge completion of the requested update. If the video bookmark could not be modified, an error code is returned.

Figure 4D:
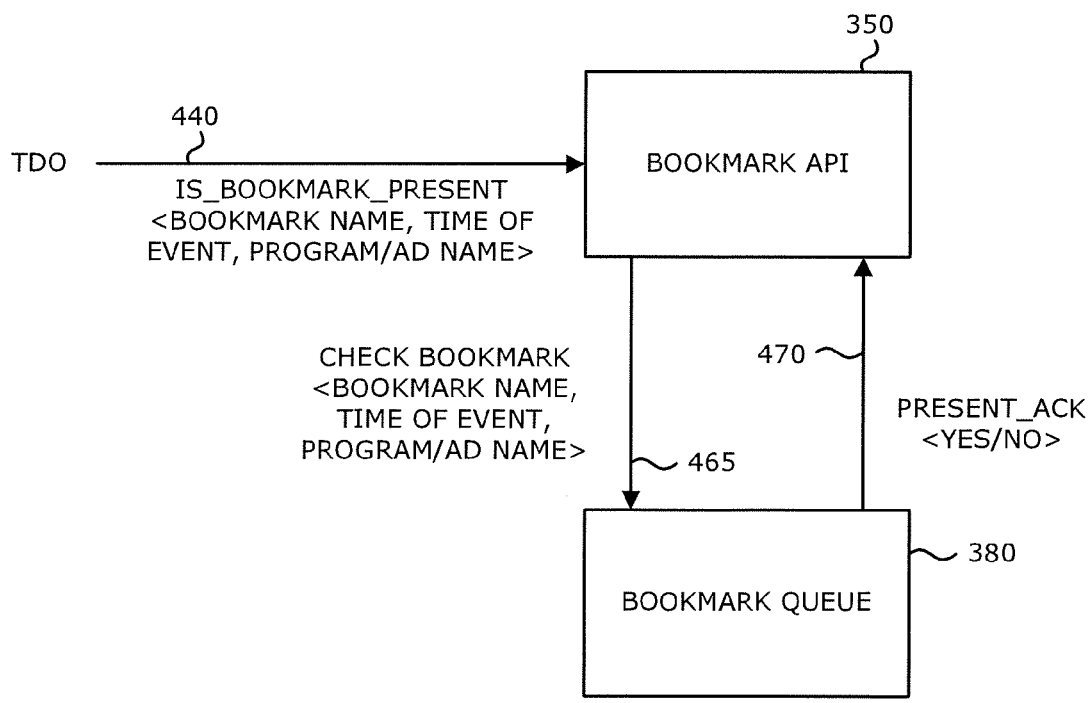

Referring to FIG. 4D, in response to detection of a bookmark event, TDO 280 may initially transmit an IS_BOOKMARK_PRESENT API function call 460 to Bookmark API 350 prior to CREATE_BOOKMARK API function call 400. Upon receipt of IS_BOOKMARK_PRESENT API function call 460, Bookmark API 350 communicates with bookmark queue 380 and TDO 280 to determine whether or not a specific video bookmark already has been created. This may constitute a review within bookmark queue for parameters 465 including name and/or timing for programming being viewed to determine if information with such programming has been video bookmarked. Thereafter, signaling 470 is provided to the Bookmark API 350 to acknowledge the presence or lack of presence of the requested video bookmark.

Referring back to FIG. 3, it is contemplated that material returned from a bookmark queue 380 to TDO 280 via Bookmark API 350 may be a URL to a website where further information on that product or service may be found. TDO 280 now interacts with Bookmark API 350 for retrieval of one or more web pages associated with the website. Alternatively, TDO 280 may receive a URL that, if selected, renders information to complete a purchase of the product being offered during the bookmark event. In lieu of return of a web page associated with the URL, server 360 could return declarative content (e.g. text and graphics, scripts, etc.), an audio/visual clip, interactive multimedia content or even an application.

Figure 5:
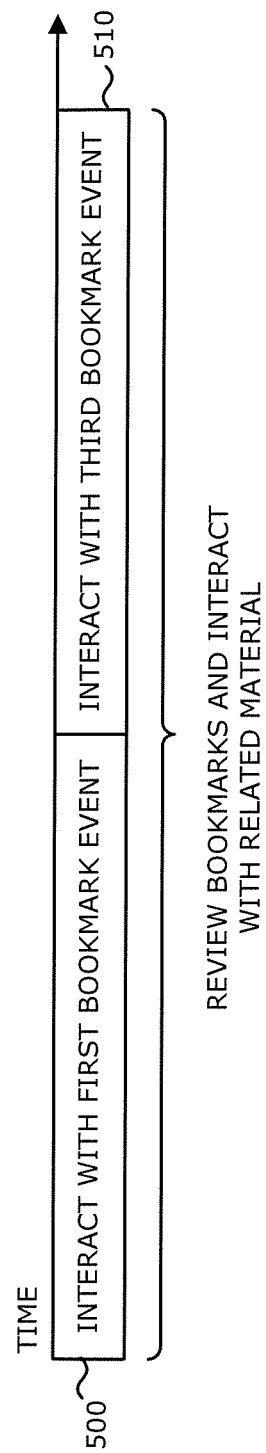
FIG. 5 is an exemplary implementation for user actions that may occur after storing one or more video bookmarks.

Referring to FIG. 5, an exemplary implementation for user actions that may occur after storing one or more video bookmarks is shown. One of these user actions may involve reviewing of the content associated with the video bookmarks that have been previously stored. In this exemplary embodiment, video bookmarks that have been stored under the control of TDO 280 may be reviewed by the user. One or more of these video bookmarks may be chosen to retrieve its corresponding multimedia content. For instance, TDO may interact with stored devices to retrieve content in response to a first bookmark event 500, while at a later time, content associated with a third bookmark event 510 may be retrieved.

According to one embodiment of the invention, metadata available to the receiver at the time of the bookmark event would be stored locally, and this metadata may be used to create the user interface associated with the "video bookmark review" activity. This user interface provides the user with the ability to view the metadata or a subset thereof and take actions by making menu selections to accomplish functions such as: reviewing stored video bookmarks; displaying information from one or more URLs; downloading executable objects; reviewing video bookmarked audio or video content; reviewing stored and audio and video clips associated with the subject of the video bookmarked content; interacting with downloaded executable objects; viewing or sending email messages; or interactive purchase activities.

Figure 6:
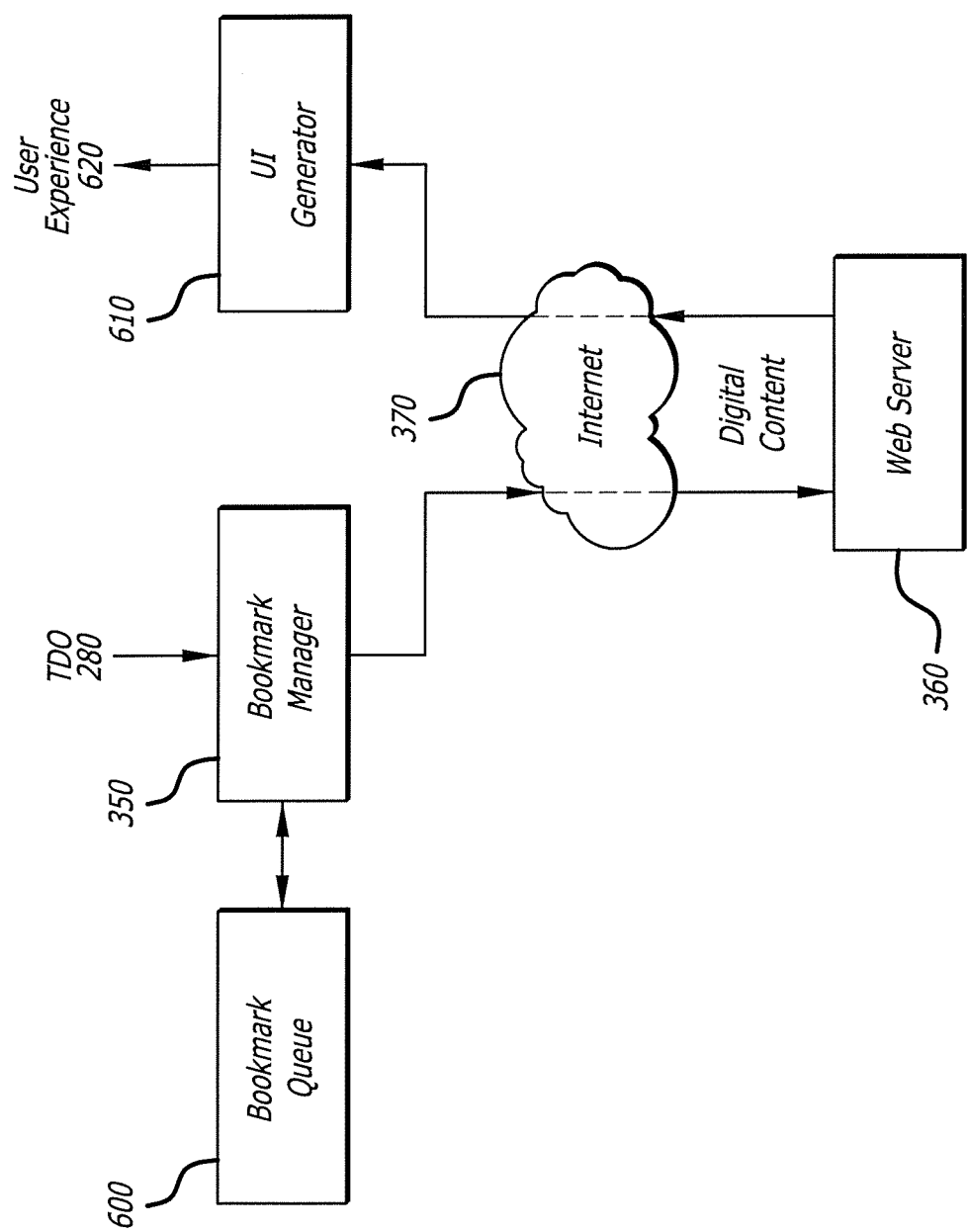
FIG. 6 is an exemplary embodiment of a receiver that is adapted to utilize metadata gathered at the time of a bookmark event.

Referring now to FIG. 6, upon selection of a video bookmark that has been previously created and/or updated by a TDO 280, information associated with the video bookmark is retrieved from a bookmark queue 600 by Bookmark Manager 350. According to one embodiment of the invention, Bookmark Manager 350 is adapted to provide an Application Programming Interface (API) for use in initiating function calls to Bookmark Manager 350. Bookmark Manager 350 processes these function calls to manage retrieval of related information via public network 370 such as accessing server 360 operating as a web server over the Internet.

Upon receiving information associated with the video bookmark and, where such information is a URL or at least one pointer to a set of files, Bookmark Manager 350 generates one or more requests to obtain content via public network 370 using the URL or pointer(s). In this exemplary implementation, the URL may be directed to content for products or services displayed during detection of a bookmark event that causes creation (or alteration) of the video bookmark, such as an extended-length video clip for example. Server 360 may process any URLs received with the video bookmark and associate the retrieved content for the video bookmark.

Thereafter, server 360 may transmit all processed video bookmark information through the public network 370 to a user interface (UI) generator 610 for inclusion in a user-oriented presentation of the processed data. Additionally, text that is scraped from a video presentation, such as in a non-limiting example, information that represents a video barcode, may be transmitted to UI generator 610 to be formatted and prepared for inclusion in the user oriented presentation of the processed data received from web server 360. The content received from web server 360 is used to generate a user experience 620 whenever the user wishes to interact with a particular video bookmark. This user experience 620 may have a number of forms:

For receivers with PVR functionality, the time of the bookmark event can be saved as a regular "chapter point," allowing the user easy navigation to that point when re-playing the program from electronic storage;

Review of the high-resolution video stills, which can serve to allow the user to capture a phone number, address, product name, or other information;

Review of a short clip, for the same purpose;

If metadata is available, the receiver can create a user experience based on it.

Figure 7:
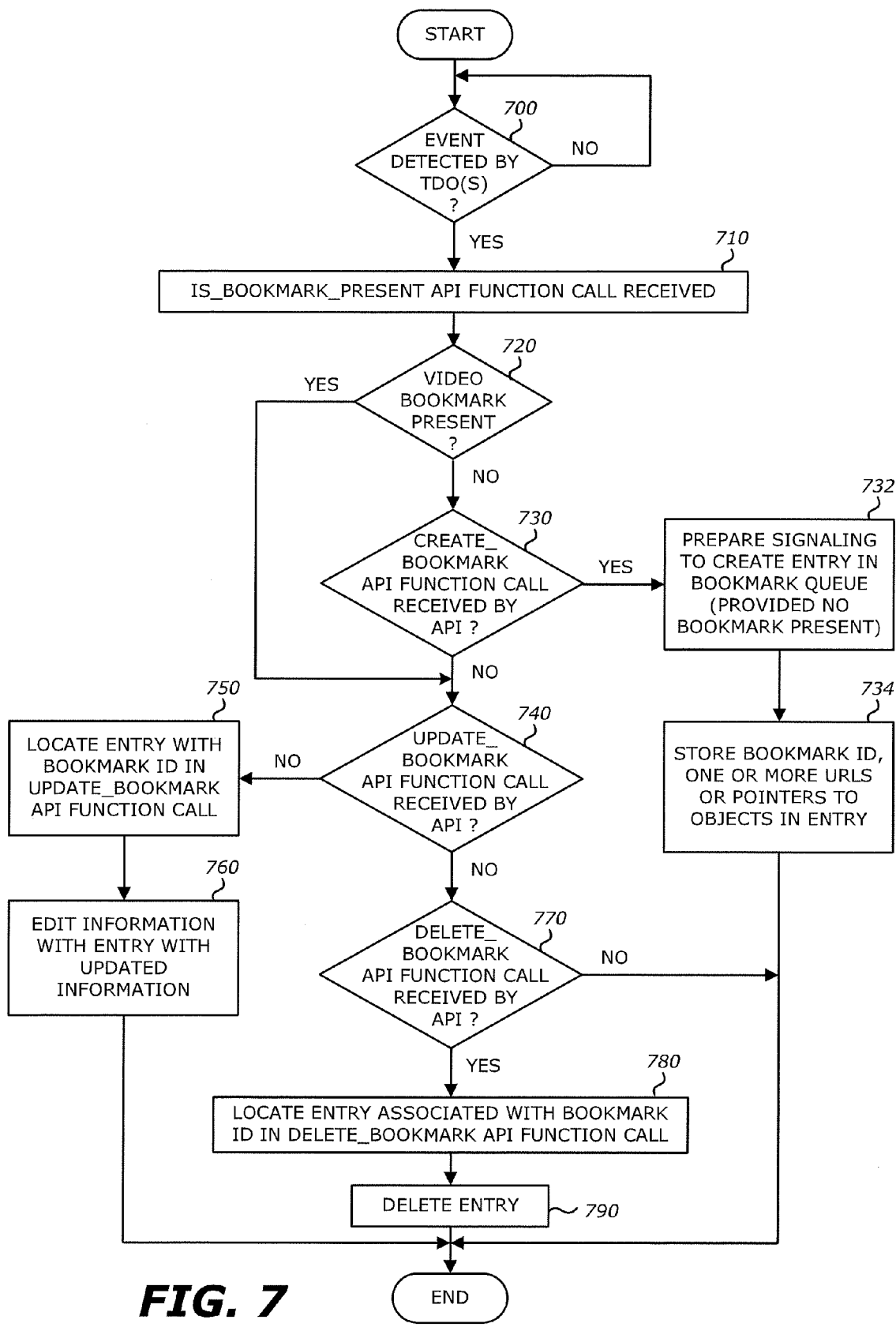
FIG. 7 is an illustrative example flow diagram for video bookmark capture and interaction consistent with certain embodiments of the invention.

Referring now to FIG. 7, a flowchart of the operations of a TDO for managing video bookmarks is shown. Herein, a TDO determines whether a bookmark event has occurred (block 700). If so, the TDO initially determines if the bookmark event is directed to the creation of a video bookmark or the alteration of the video bookmark. This may be accomplished through the use of an IS_BOOKMARK_PRESENT API function call.

More specifically, the TDO creates and forwards an IS_BOOKMARK_PRESENT API function call to the Bookmark API (block 710). This causes the Bookmark API to query the bookmark queue for a video bookmark associated with the particular bookmark event (block 720). If the video bookmark is detected, the bookmark queue returns a Bookmark ID and pertinent information directed to the bookmark event. Otherwise, the bookmark queue returns information that is forwarded to the TDO to indicate that a video bookmark for the bookmark event has not been created.

Next, TDO creates and forwards a CREATE_BOOKMARK API function call to the Bookmark API to create a video bookmark associated with the bookmark event (block 730). The video bookmark is identified by an identifier and may store information such as a URL, pointer or the like. The Bookmark ID is returned to the Bookmark API (blocks 732 and 734).

If the bookmark event is directed to alteration of a video bookmark, the TDO determines whether the video bookmark is to be updated or deleted (blocks 740 and 770). If the video bookmark is to be updated, the TDO creates and forwards an UPDATE_BOOKMARK API function call to the Bookmark API. This causes the Bookmark API to query the bookmark queue to locate an entry with the Bookmark ID within the UPDATE_BOOKMARK API function call and to alter information within the entry (blocks 750 & 760). Such information may include, but is not limited or restricted to URLs or pointers to stored data, or the like.

If the video bookmark is to be deleted, the TDO creates and forwards a DELETE_BOOKMARK API function call to the Bookmark API (block 770). This causes the Bookmark API to query the bookmark queue for the video bookmark identified by the Bookmark ID within the DELETE_BOOKMARK API function call and to delete the video bookmark from the bookmark queue (blocks 780 & 790).

Figure 8:
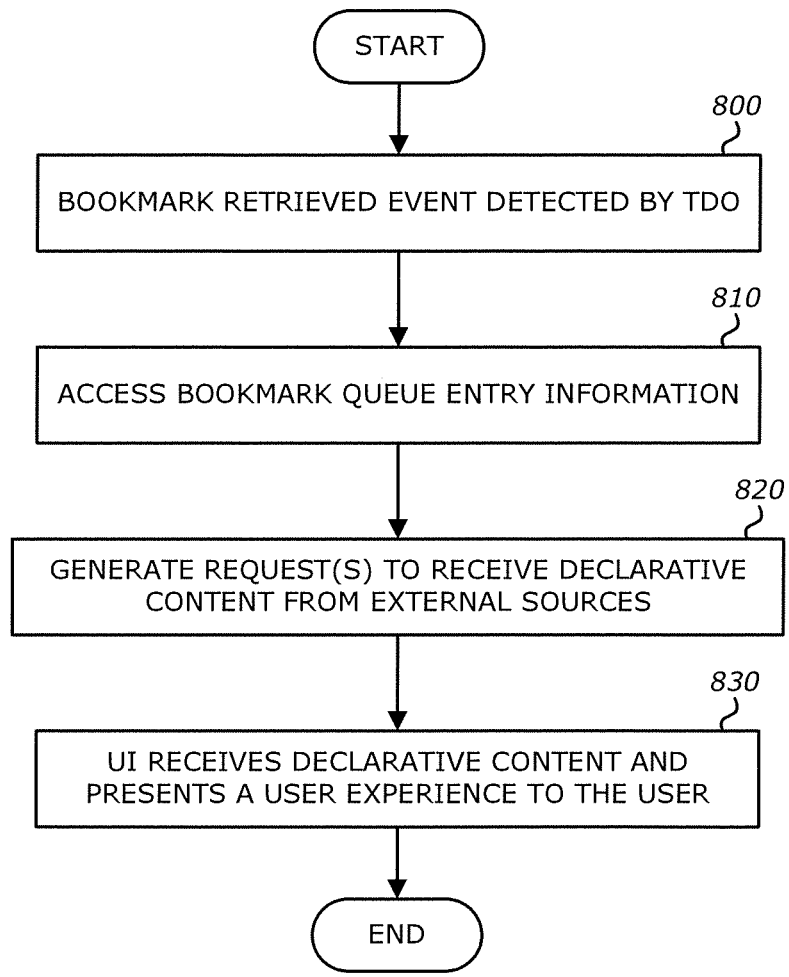
FIG. 8 is an illustrative example flow diagram of a server retrieval action for video bookmarks consistent with certain embodiments of the invention.

Turning now to FIG. 8, an exemplary embodiment of the operations initiated based on receipt by the TDO of a bookmark event to retrieve content is shown. Herein, a bookmark event to retrieve content is detected by the TDO (block 800). In response, the TDO sends signaling to the Bookmark API to acquire addressing information for the content from the bookmark queue residing within local memory (block 810). From such addressing information, the bookmark API generates one or more requests for content from external sources such as a remotely located server (e.g., web server) for example (block 820). The content is provided to a user interface (UI) to provide a user experience to the user (block 830).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of an information processing apparatus for creating a bookmark, comprising:
   reproducing video content received by the information processing apparatus;
   executing, by circuitry of the information processing apparatus, a downloadable triggered declarative object (TDO) in synchronization with the reproduced video content;
   processing, by the circuitry of the information processing apparatus, a request from the TDO to create the bookmark, the bookmark including a location of a declarative object that is related to the video content being reproduced at a time of the request; and
   creating the bookmark based on the request.

2. The method of claim 1, wherein the bookmark includes an image from the reproduced video content captured at the time of the request.

3. The method of claim 1, wherein the bookmark includes metadata associated with a product or service being displayed during reproduction of the video content.

4. The method of claim 3, wherein the location of the declarative object is defined by a uniform resource locator (URL).

5. The method of claim 3, wherein the location of the declarative object is defined by a pointer to one or more files stored externally from the information processing apparatus.

6. The method of claim 1, wherein the processing includes receiving an Application Programming Interface (API) function call into an Application Programming Interface, the API function call being translated into signaling to create the bookmark, the signaling includes addressing information for subsequent use in retrieving the declarative object from an external source.

7. The method of claim 6, wherein the signaling further includes an identifier for use in avoiding repetitive storage of bookmarks.

8. An electronic device comprising:
circuitry configured to
reproduce video content, and
execute a downloadable triggered declarative object (TDO) in synchronization with the reproduced video content, the TDO being configured to detect a bookmark event during reproduction of the video content, the bookmark event being an event that causes creation of metadata, the metadata including a location of a declarative object that is related to the video content being reproduced at a time of the bookmark event.

9. The electronic device of claim 8 being a digital television including a receiver including the circuitry.

10. The electronic device of claim 9, wherein the circuitry includes a tuner, a demultiplexer coupled to the tuner, and a decoder coupled to the demultiplexer and a display.

11. The electronic device of claim 8, wherein the metadata is part of a bookmark that is associated with a product or service being displayed during reproduction of the video content.

12. The electronic device of claim 11, wherein the location of the declarative object is defined by a uniform resource locator (URL).

13. The electronic device of claim 11, wherein the TDO executed by the circuitry further generates an Application Programming Interface (API) function call that is subsequently translated into signaling to create the bookmark, the signaling includes an identifier for subsequent use in identifying the bookmark and addressing information for subsequent use in retrieving the declarative object from an external source.

14. The electronic device of claim 8, wherein the the location of the declarative object is defined by a pointer to one or more files stored externally from the electronic device.

15. A non-transitory storage medium to store an executable object that, when executed by a processor, causes an electronic device, implemented with both the non-transitory storage medium and the processor, to perform operations comprising:
reproducing video content received by the information processing apparatus;
executing, by the processor, a downloadable triggered declarative object (TDO) in synchronization with the reproduced video content;
processing, by the processor, a request from the TDO to create a bookmark, the bookmark including a location of a declarative object that is related to the video content being reproduced at a time of the request; and
creating the bookmark based on the request.

16. The non-transitory storage medium of claim 15, wherein the information within the bookmark includes metadata associated with a product or service being displayed during reproduction of the video content.

17. The non-transitory storage medium of claim 15, wherein the location of the declarative object is defined by a uniform resource locator (URL).

18. The non-transitory storage medium of claim 15, wherein the location of the declarative object is defined by a pointer to one or more files stored externally from the electronic device.

* * * * *